Figure 1:
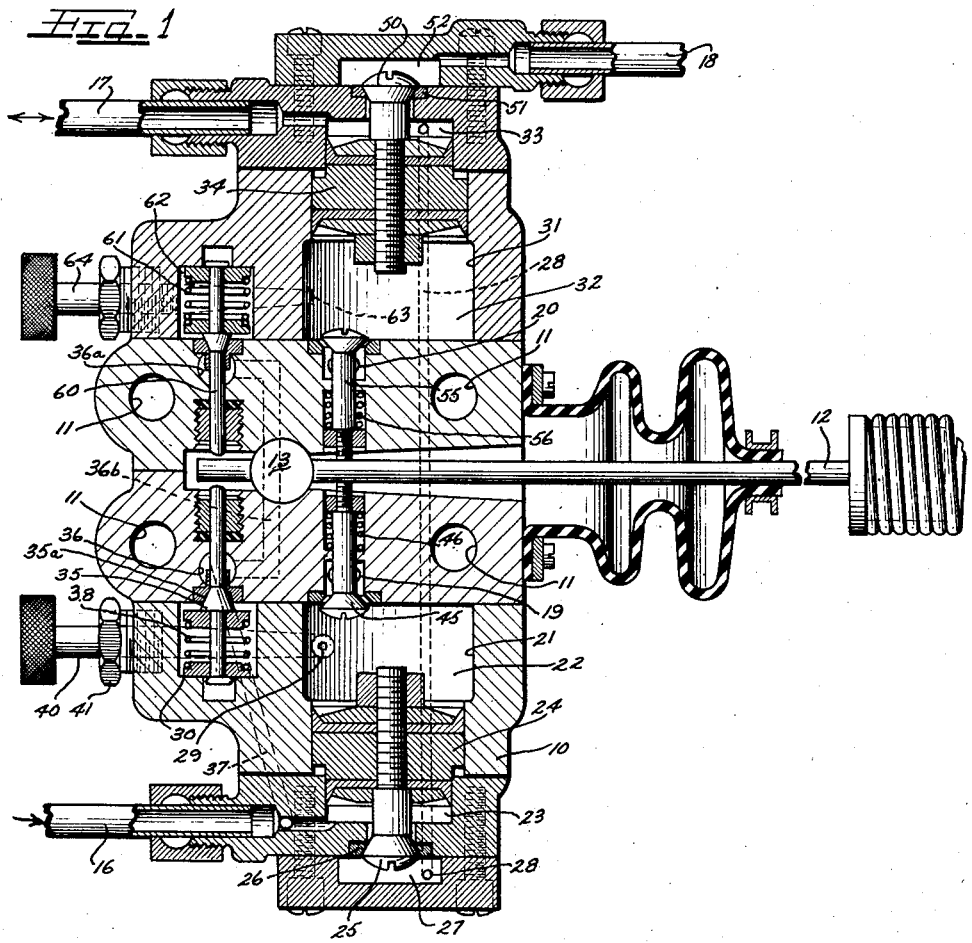

Nov. 17, 1959    S. H. NORTON    2,913,004
VEHICLE LEVELING VALVE
Filed March 14, 1957

Inventor
SAMUEL H. NORTON

By    Attys.

United States Patent Office 2,913,004
Patented Nov. 17, 1959

2,913,004
VEHICLE LEVELING VALVE

Samuel H. Norton, University Heights, Ohio, assignor to Thompson Ramo Wooldridge Inc., a corporation of Ohio Application March 14, 1957, Serial No. 645,954

4 Claims. (Cl. 137—596)

The present invention relates to vehicle suspension systems and is, more particularly, concerned with the provision of a substantially improved leveling control valve for regulating the height of a vehicle frame relative to its axles through the automatic control of hydraulic fluid confined in hydraulic springs.

As those skilled in the art of automotive vehicle suspensions are aware, many developments have recently been made relative to the suspension of such vehicles on hydraulic springs either of the pneumatic or liquid type. An important advantage of such hydraulic springs over the previously commercially employed steel springs lies in the fact that the effective length of a hydraulic spring may very readily be modified through the introduction of additional fluid under pressure, or the release of fluid therefrom. Accordingly, recently developed hydraulic suspensions have almost without exception employed some means for regulating the height of the vehicle body relative to the wheel axles to thereby provide a constant height of the vehicle frame independent of the number of persons carried by the vehicle or the load thereon. Such prior systems have usually employed at least one valve controlling the flow of hydraulic fluid under pressure to and from one or more of the hydraulic springs employed between the individual wheel axles and the vehicle frame. Such valves employ a sensing lever; the position of which reflects the relative distance between the wheel axle and the frame. The sensing lever in turn actuates the valve components to provide the necessary control.

Difficulties have been encountered in the provision of a truly satisfactory leveling control valve, however. Such difficulties have been encountered as a result of the fact that automotive vehicles must be capable of satisfactory use in extremes of temperature, the valves must be relatively inexpensive and, further, simple and preferably adustable means must be provided for securing a time delay between deflection of the sensing lever and actual control valve opening to prevent operation of the leveling valve under the application of solely transient loads. In accordance with the principles of the present invention, an improved leveling valve structure is provided wherein the desirable features are inexpensively and effectively provided.

In accordance with the principles of the present invention, a leveling valve particularly adapted for satisfactory use with pneumatic vehicle springs is provided. The valve housing is provided with a fluid connection with one or more pneumatic springs, a low pressure vent to atmosphere and a pressure inlet supplied with air under pressure from any convenient source. A sensing lever essentially responsive to changes in relative position between the vehicle frame and the wheels is movably secured in the housing and is positioned for actuation of alternative pilot valves. These pilot valves control the flow of fluid under pressure from the inlet source to respective fluid motors that directly operate valves controlling flow either to the spring connection from the inlet or from the spring connection to the vent. Time delay is provided in the valve in an extremely effective manner, which is relatively unaffected by temperature changes by providing a restricted orifice between the pilot valve and the fluid motor of each fluid motor-pilot valve combination. This restricted orifice is provided with a convenient adustment and thus operates to provide a controlled period of delay between the actuation of the pilot valve by the sensing lever and the build up of sufficient pressure in the respective leveling valve fluid motor sufficient to open the leveling valve. Since the delay mechanism thus provided is completely pneumatic, temperature variations encountered during vehicle operations have substantially no ill effect on the delay means. Further, in view of the nature of the time delay means, adjustment may readily be made at any time and, in fact, such adjustment may conveniently be accomplished from within the passenger compartment of the vehicle through a control linkage of any conventional type.

It is, accordingly, an object of the present invention to provide a simple and essentially temperature stable leveling valve system for vehicles, or the like.

Another object of the present invention is to provide an improved time delay position responsive valve.

Yet another object of the present invention is to provide a position responsive valve for controlling pneumatic springs, or the like and incorporating pneumatic time delay means.

Still a further object of the present invention is to provide an improved position-responsive valve incorporating pneumatically actuated valve means under the control of a mechanically actuated position-responsive pilot valve.

Still a further object of the present invention is to provide an improved resilient connection for actuation of a position-responsive control valve in vehicle suspensions or the like.

Still a further object of the present invention is to provide a position-responsive leveling valve having means therein for delaying opening of the leveling valve but permitting closure thereof without such delay.

A feature of the invention resides in the provision of pneumatic time delay control for a leveling valve.

Another feature is the provision of a pneumatic pilot valve for co-operation with a pneumatically actuated leveling valve, in a vehicle leveling system.

Still a further feature of the invention is the provision of readily adjustable time delay means for use with a pneumatic leveling valve control system.

As shown in the figures of the drawing, a valve housing 10 is provided. This housing is preferably secured to a stationary portion of the frame of a vehicle, or the like, by means of bolts or other securing means passing through holes 11. A sensing lever 12 is pivotally mounted within the housing 10, as at 13 and is secured to a wheel axle or other portion of the unsprung mass of the vehicle via a mechanical link 14 and a resilient spring 15. It is preferred that the housing 10 be secured to the vehicle frame in such a manner as to be in an upright position as shown in Figure 1 such that when the vehicle frame drops downwardly relative to an individual wheel axle, as the result of an increase in vehicle load, the link 14 will move upwardly resiliently moving the lever 12 upwardly in a counterclockwise direction relative to the housing 10 as viewed in Figure 1. It is desired, and the present invention fulfills this desire, that upon such upward movement of the link 14, fluid under pressure be added to a spring, not shown, positioned between the frame and the axle to expand the spring and lift the vehicle frame upwardly to return it to a predetermined elevated position relative to the axle and the link 14. Oppositely, if the vehicle frame should move upwardly relative to the link 14 and the individual wheel axle, as a result of removal of loads from the vehicle, the sensing lever 12 will move clockwise relative to the housing 10 and in accordance with the structure to be more fully set forth below, air is removed from the respective vehicle spring to cause deflation of the spring and resultant downward movement of the vehicle frame.

In the specific embodiment illustrated, a source of hydraulic fluid, such as for example, air, is provided and is connected to the housing 10 via conduit 16. The housing 10 is provided with an outlet connected to a pneumatic vehicle spring, or the like, as shown at 17 and is provided with an additional vent to atmosphere as indicated at 18. Additional atmospheric vents are provided at 19 and 20. It will be understood that substantially any conventional source of fluid under pressure may be employed for supplying the inlet conduit 16 with fluid at a pressure substantially greater than the maximum contemplated pressure in the spring conduit 17.

With the above pressure conditions, the introduction of additional hydraulic fluid under pressure from the conduit 16 to the spring conduit 17 will now be described. As shown, the housing 10 is provided with a multi-diameter bore 21 divided into fluid motor chambers 22 and 23 by means of a piston 24 carrying a poppet valve 25 fixedly secured thereto. As will be seen, the chamber 23 comprises a reduced diameter bore compared to the chamber 22 such that upon the application of equal pressures to the chambers 22 and 23 the poppet valve 25 will be moved downwardly as viewed in Figure 1 by the differential forces acting on the piston 24. This downward movement of the valve 25 will open the valve port 26 permitting fluid under pressure to flow from conduit 16 into chamber 27 via chamber 23 and port 26. The chamber 27 is directly connected ot the spring conduit 17 via a connecting conduit 28 and chamber 33.

It will thus be seen that the valve 25 is opened to permit flow of fluid pressure into the spring conduit 17, by means of a fluid motor piston 24. The piston 24 is, in the embodiment illustrated, caused to move downwardly upon the application of fluid pressure in the conduit 16 to the chamber 22. As illustrated, the chamber 22 is provived with a control port 29 leading to a pilot valve chamber 30. The pilot valve chamber 30 is in turn under a fluid pressure determined by a pilot valve 35 which connects the chamber 30 with a supply conduit 36 leading directly to the conduit 16 via an intermediate conduit 37. Accordingly, upon downward movement of the pilot valve 35 against pilot valve spring 38, fluid will flow from chamber 36 to pilot valve chamber 30 via valve port 35a, through the port 29 into chamber 22. The rate of flow through the port 29 is governed by means of a needle valve 40 threadedly mounted in the housing 10 as at 41 for adjusting reciprocation into and out of the port 29.

Reciprocation of the pilot valve 35 is accomplished directly by means of the position-sensing lever 12. Upon counterclockwise oscillation of the lever 12 relative to the housing 10, as viewed in Figure 1, which oscillation occurs upon downward movement of the vehicle frame relative to a wheel axle, the pilot valve 35 will be moved downwardly connecting chamber 22 to pressure conduit 16 via chamber 30. However, this fluid connection is restricted by the needle valve 40 and accordingly, the pressure built up in the chamber 22 occurs at a controlled, gradual rate. It has been found in practice that a time lapse of approximately 3 to 5 seconds between the time of actuation of the pilot valve 35 and build-up of pressure in chamber 22 sufficient to open the valve 25 provides a satisfactory time delay. It will be understood, however, that by the adjustment of the needle valve 40, substantially any time delay may be achieved, with increase in delay occurring with increased restriction of the port 29.

If, as above described, the leveling valve 25 is opened as a result of the application of an additional load to the vehicle, fluid under pressure will flow from conduit 16 to the pneumatic spring conduit 17 tending to expand the pneumatic spring and move the vehicle body upwardly. As a result of the connection of the lever 12 to a wheel axle via the link 14 and the resilient connection 15, the lever 12 will be moved in a clockwise direction relative to the housing 10 as the vehicle spring expands. As the vehicle reaches its predetermined design height the lever 12 will become centered and the pilot valve 35 will close. At the same time, centering of the lever 12 will open a vent valve 45 against the bias of spring 46 to vent the chamber 22 to an atmospheric pressure vent 19 thereby reducing the pressure in chamber 22 to substantially atmospheric. Upon the reduction of pressure in chamber 22, the pressure in chamber 23 will move the piston 24 upwardly as shown in Figure 1, closing the leveling valve 25. It will be noted that no delay is provided in closing the valve 25 when the lever 12 reaches its central position. This is a desirable feature since the immediate closure of the valve upon centering of the lever 12 prevents overtravel of the vehicle spring expansion. Accordingly, hunting of the suspension is prevented.

Operation of the leveling valve structure of the present invention to relieve air from the spring conduit 17, upon a removal of load from the vehicle, is accomplished in a manner similar to that above described relative to the addition of fluid under pressure. As may be seen, the housing 10 is provided at its upper portion with a generally vertical bore 31 forming a large diameter chamber 32 and a smaller diameter chamber 33 separated by a piston 34 fixedly carrying a leveling vent valve 50. The vent valve 50 seats on a valve port 51 connecting the chamber 33 with chamber 52 in communication with the atmosphere via conduit 18.

Fluid pressure in the chamber 32 will be substantially atmospheric when the control lever 12 is in its neutral position. This pressure is assured by means of the vent valve 55 which is maintained opened against spring 56 until such time as the lever 12 is moved in a clockwise direction relative to the housing 10. When the valve 55 is opened, the chamber 32 is vented to atmosphere via port 20. Upon clockwise movement of the sensing lever 12, however, the valve 55 is permitted to close in response to pressure exerted thereon by spring 56. Continued movement of the lever 12 in the clockwise direction reciprocates a pilot valve 60 upwardly against the bias of spring 61 to apply fluid under pressure from intermediate conduit 36a (connected to conduit 36 via conduit 36b) to pilot valve chamber 62 and thence to chamber 32 via port 63 under the control of a needle valve 64.

It will, accordingly, be seen that the pressure within the chamber 32 may be varied from substantially atmospheric to a pressure approaching the pressure in the supply conduit 16. As above noted, the pressure in the conduit 16 is at all times above the maximum design pressure in the spring 17 and accordingly, when the valve 55 is closed and the chamber 32 is connected to the pressure source 16 upon opening of the pilot valve 60, a build-up of pressure in the chamber 32 to a level substantially that in the conduit 16 will move the piston 34 upwardly against the spring pressure in chamber 33 to open the leveling vent valve 50. This opening movement of the valve 50 will permit air under pressure to leave the spring conduit 17 and pass to the atmospheric pressure vent conduit 18 thereby permitting the vehicle spring to collapse. Collapsing movement of the vehicle spring will cause the link 14 to move upwardly, returning the lever 12 to its centered condition in which the valve 55 is opened and the pilot valve 60 is closed thereby cutting off the further flow of air from conduit 17 to the vent conduit 18 by venting of chamber 32 to atmosphere and the resulting movement of leveling vent valve 50 by its piston 34. As in the case of the leveling valve 25, the leveling vent valve 50 is permitted to close rapidly, without time delay while the opening thereof is provided with time delay as a result of the restriction in port 63.

As a result of the above leveling valve construction, it will be apparent that oscillation of the sensing lever 12 rapidly, such as occurs when the link 14 to which the lever 12 is resiliently connected vibrates rapidly, will cause operation of neither of the valve 25 nor the valve 50. This is true since rapid cyclical operation of the pilot valves 35 and 60 will not permit sufficient build-up in the respective chambers 22 and 32 to unseat the respective valves 25 and 50. However, upon the change in the position of the lever 14 relative to the housing 10 for a substantial duration of time, the pilot valve 35 or the pilot valve 60 will be actuated for a sufficient period of time to cause opening of one or the other of the valves 25 and 50. Accordingly, it will be seen that the leveling valve of the present invention provides very satisfactory selectivity, thereby preventing continuous leveling operation of a vehicle to which the valve is attached when that vehicle is merely subjected to transient road vibrations, and the like. As above described, the needle valves 40 and 64 may, if desired, be connected through a mechanical linkage to the vehicle driver compartment so that the time delay may be adjusted conveniently. It will, further, of course, be understood that a leveling valve exactly the same as illustrated in Figure 1 may be employed each of the four pneumatic vehicle springs generally employed with automotive vehicles, with the sensing lever 12 of the individual leveling valve being resiliently secured to an associated wheel axle in any convenient manner fully well known to those skilled in the art of vehicle leveling.

Figure 2:
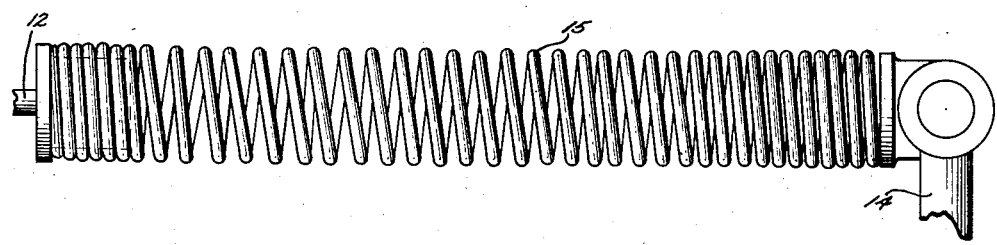

The present leveling valve system is extremely sensitive since the lever 12 is not forced to operate against a body of damping fluid, or the like. Accordingly, a resilient connection such as the spring 15, may be employed between the sensing link 14 and the lever 12. The spring 15 is, as may be seen from a consideration of Figures 1 and 2, deflectable along its longitudinal axis and, since the spring 15 is a helical spring, such deflection transversely of its longitudinal axis is relatively easily accomplished. As a result, relatively little load is applied to the lever 12 and, accordingly, wear on the pivot 13 and associated valves 35, 45, 55 and 60 is maintained at an absolute minimum.

It will thus be seen, that I have provided a novel and substantially improved position-responsive valve having completely adjustable and substantially temperature-stable time delay operation for use in vehicle leveling systems, or the like. While a preferred embodiment of the invention is illustrated in the drawings, it will at once become apparent to those skilled in the art that variations and modifications may be made in the structure lilustrated without departing from the scope of the novel concepts of the present invention. Accordingly, it is my intention that the scope of the present invention be limited solely by the hereinafter appended claims.

I claim as my invention:

1. A leveling valve comprising a valve housing, an outlet port in the housing for connection to a fluid spring, or the like, a vent port in the housing leading to atmosphere, an inlet port in the housing under a high fluid pressure, a control lever mounted in said housing for movement in opposite directions to selectively control the fluid pressure at said outlet by selectively connecting said outlet to said vent port or said inlet port, a first valve connecting said outlet port to said inlet port, a second valve connecting said outlet port to said vent port, fluid motor means for actuating said first and second valves including means normally biasing said motor means against movement to open either of said valves, first and second pilot valves directly alternately contacted and opened by said lever for selectively supplying fluid from said inlet to said fluid motor means to overbalance said biasing means to selectively actuate said first or second valves respectively and time delay means for delaying actuation of said first and second valves in response to movement of said lever, said time delay means comprising a valve restriction between said first and second pilot valves and said fluid motor means.

2. A leveling valve comprising a valve housing, an outlet port in the housing for connection to a fluid spring, or the like and maintained under a variable positive pressure by said valve, a vent port in the housing leading to atmosphere, an inlet port in the housing under a high fluid pressure, a control lever mounted in said housing for movement in opposite directions to selectively control the fluid pressure at said outlet by selectively connecting said outlet to said vent port or said inlet port, a first valve connecting said outlet port to said inlet port, a second valve connecting said outlet port to said vent port, fluid motor means for actuating said first and second valves including means normally biasing said motor means against movement to open either of said valves, first and second pilot valves connecting the inlet to said fluid motors and directly alternately contacted and opened by said lever for selectively supplying fluid from said inlet to said fluid motor means to selectively open said first or second valves respectively and time delay means for delaying actuation of said first and second valves in response to movement of said lever, said time delay means comprising a valve restriction between said first and second pilot valves and said fluid motor means, said fluid motor means comprising a separate fluid motor operatively connected to each of said first and second valves and said biasing means comprising a fluid connection from the side of each of said fluid motors opposite to the connection with its respective pilot valve to a source of positive fluid pressure.

3. A leveling valve comprising a valve housing, an outlet port in the housing for connection to a fluid spring, or the like and maintained under a variable positive pressure by said valve, a vent port in the housing leading to atmosphere, an inlet port in the housing under a high fluid pressure, a control lever mounted in said housing for movement in opposite directions to selectively control the fluid pressure at said outlet by selectively connecting said outlet to said vent port or said inlet port, a first valve connecting said outlet port to said inlet port, a second valve connecting said outlet port to said vent port, fluid motor means for actuating said first and second valves including means normally biasing said motor means against movement to open either of said valves, first and second pilot valves connecting the inlet to said fluid motors and directly alternately contacted and opened by said lever for selectively supplying fluid from said inlet to said fluid motor means to selectively open said first or second valves respectively and time delay means for delaying actuation of said first and second valves in response to movement of said lever, said time delay means comprising a valve restriction between said first and second pilot valves and said fluid motor means, said fluid motor means comprising a separate fluid motor operatively connected to each of said first and second valves, and said biasing means comprising a fluid connection from side of each of said fluid motors opposite to the connection with its respective pilot valve to a source of positive fluid pressure, each of said separate fluid motors having an individual disabling vent for venting said fluid motor to atmosphere and actuated directly by said lever upon movement of said lever to an intermediate, neutral position.

4. A leveling valve comprising a valve housing, an outlet port in the housing for connection to a fluid spring, or the like and maintained under a variable positive pressure by said valve, a vent port in the housing leading to atmosphere, an inlet port in the housing under a high fluid pressure, a control lever mounted in said housing for movement in opposite directions to selectively control the fluid pressure at said outlet by selectively connecting said outlet to said vent port or said inlet port, a first valve connecting said outlet port to said inlet port, a second valve connecting said outlet port to said vent port, first and second separate fluid motors for actuating said first and second valves respectively including means normally biasing said motor means against movement to open either of said valves, first and second pilot valves connecting the inlet to said fluid motors and directly alternately contacted and opened by said lever for supplying fluid from said inlet to respective first and second fluid motors to selectively open said first or second valves, and fluid flow restriction means in the conduits between each respective pilot valve and its fluid motor providing time delay means for delaying actuation of said valves in response to opening of said first or second pilot valves respectively, each said fluid motor having a motor chamber placed under pressure by opening its respective pilot valve, said biasing means comprising a fluid connection from the side of each of said fluid motors opposite to said motor chamber to a source of positive fluid pressure and each said chamber having a vent valve for venting said chamber to atmosphere, means on said lever for contacting and opening the vent valve of each of said chambers upon positioning of said lever in a midpoint condition and for opening the vent valve of the chamber of said first fluid motor upon operation of said second pilot valve to energize said second fluid motor and for opening the vent valve of said second chamber upon operation of said first pilot valve to actuate said first fluid motor.

References Cited in the file of this patent

UNITED STATES PATENTS

| | | |
|---|---|---|
| 1,938,958 | Goldman | Dec. 12, 1933 |
| 2,446,714 | Milner | Aug. 10, 1948 |
| 2,471,320 | Gilson | May 24, 1949 |